US011582900B2

(12) United States Patent
Pederson et al.

(10) Patent No.: US 11,582,900 B2
(45) Date of Patent: Feb. 21, 2023

(54) DISTRIBUTION ORIFICE SYSTEM FOR A DRY AGRICULTURAL PRODUCT APPLICATOR

(71) Applicant: CNH Industrial Canada, Ltd., Saskatoon (CA)

(72) Inventors: Nicholas R. Pederson, Willmar, MN (US); Joel Denis, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 439 days.

(21) Appl. No.: 16/746,193

(22) Filed: Jan. 17, 2020

(65) Prior Publication Data

US 2021/0222799 A1 Jul. 22, 2021

(51) Int. Cl.
| | |
|---|---|
| *A01C 15/04* | (2006.01) |
| *A01C 7/08* | (2006.01) |
| *A01C 21/00* | (2006.01) |
| *F16L 23/18* | (2006.01) |

(Continued)

(52) U.S. Cl.

CPC .............. *A01C 15/04* (2013.01); *A01C 7/082* (2013.01); *F16L 23/18* (2013.01); *A01C 21/002* (2013.01); *F15D 1/025* (2013.01); *F16L 55/027* (2013.01)

(58) Field of Classification Search
CPC ... F16L 19/0212; F16L 19/0218; F16L 23/18; F16L 23/036; F16L 23/04; F16L 23/08; F16L 23/20; F16L 55/027; F16L 55/02718; A01C 15/04; A01C 21/002; A01C 7/082; A01C 23/002
USPC ............... 285/337, 364, 406, 411, 420, 379; 239/159
See application file for complete search history.

(56) References Cited

U.S. PATENT DOCUMENTS 2,234,785 A * 3/1941 Tolman, Jr. .................. 285/364
2,769,648 A 11/1956 Herman
3,544,119 A * 12/1970 Glover ......................... 285/379

(Continued)

FOREIGN PATENT DOCUMENTS

CN 104110498 A 10/2014
EP 222027 A * 5/1987 ............. F16L 23/18

OTHER PUBLICATIONS

Tri-Clamp® Mini—RubberFab—https://www.rubberfab.com/products/sanitary-gaskets/standard-gaskets/tri-clamp-mini ; accessed Jul. 24, 2019.

(Continued)

*Primary Examiner* — Zachary T Dragicevich
*Assistant Examiner* — William S. Choi
(74) *Attorney, Agent, or Firm* — Rebecca Henkel; Rickard DeMille

(57) ABSTRACT

A distribution orifice system for a dry product applicator with a pneumatic conveyance system is provided which redirects product that drags along a surface(s) of a delivery line's wall(s) back into a main central or primary airflow portion that carries the product downstream through the pneumatic conveyance system. The distribution orifice system may deflect the agricultural product's particulate material radially inward away from the delivery line's wall while longitudinally advancing it in a downstream direction. The system may include a ring ramp that can be renewed by uninstalling the ring ramp, flipping it 180-degrees, and reinstalling it to present an intact ramp surface facing upstream and the wore ramped surface facing downstream.

20 Claims, 8 Drawing Sheets

(51) Int. Cl.
*F15D 1/02* (2006.01)
*F16L 55/027* (2006.01)

(56) References Cited

U.S. PATENT DOCUMENTS

| | | | |
|---|---|---|---|
| 3,545,492 | A * | 12/1970 | Scheid, Jr. ........ F16L 55/02718 |
| 3,980,311 | A | 9/1976 | Ditcher |
| 4,175,754 | A | 11/1979 | Wilhelm |
| 4,387,900 | A | 6/1983 | Ditcher et al. |
| 4,726,611 | A | 2/1988 | Sauer |
| 4,944,319 | A * | 7/1990 | Trombley |
| 6,039,319 | A | 3/2000 | Coonce et al. |
| 7,159,906 | B1 | 1/2007 | Vaudreuil et al. |
| 8,397,553 | B2 * | 3/2013 | Xu |
| 9,395,024 | B2 | 7/2016 | Bancroft et al. |
| 10,323,779 | B2 | 6/2019 | Koyanagi et al. |
| 2004/0168727 | A1 * | 9/2004 | Smahl .................... F16L 23/04 |
| 2008/0284159 | A1 | 11/2008 | Krehl |
| 2013/0257045 | A1 | 10/2013 | Syuichi |

OTHER PUBLICATIONS

U Cups—HiTech Seals—http://www.hitechseals.com/products/u-cups.asp ; accessed Jul. 24, 2019.

\* cited by examiner

DISTRIBUTION ORIFICE SYSTEM FOR A DRY AGRICULTURAL PRODUCT APPLICATOR

FIELD OF THE INVENTION

The invention relates generally to agricultural product application equipment such as self-propelled dry product applicators and, in particular, to a distribution orifice system for a dry agricultural product applicator.

BACKGROUND OF THE INVENTION

Efforts have been made to allow dry agricultural product applicators to increase coverage in a single pass of an agricultural field. These include implementing boom-based pneumatic delivery systems instead of spinner-based broadcast spreader delivery systems. Other efforts include making the applicators larger and implementing longer booms that widen the application coverage per pass. The longer booms need longer product delivery lines such as tubes or hoses to pneumatically deliver the dry agricultural product. During pneumatic delivery, dry agricultural product particulate material can drift out of the delivery line's centrally flowing main airflow portion and cling to or drag along the delivery line's inner circumferential surface or inside wall surface(s). This may include gravitationally settling out or dragging on the bottom of the inside wall. Relatively long delivery lines that move product toward the outer boom ends may be particularly susceptible to this type of gravitational or downward settling. Especially in relatively short delivery lines, besides downward settling, particulate material can cling to or drag against other portions of the inside wall such as sides and top surfaces. The particular surface(s) that particulate material may cling to or drag against during pneumatic transport may depend on, for example, a direction(s) that the particulate material's momentum carries it while flowing downstream and as bounded by the delivery line's inside wall surface(s). The particulate material's settling, dragging, or drifting out of the main airflow portion can lead to delivery inconsistencies. These inconsistencies can be worsened when it occurs near a distributor that divides the airflow into separate airflows that flow through separate downstream lines to delivery nozzles on the applicator. Particulate material settling out of the main airflow portion upstream of or inside the distributor can lead to an uneven distribution of the particulate material through the distributor's outlet(s), downstream lines, downstream delivery nozzles, and potentially uneven application to the field.

SUMMARY OF THE INVENTION

A distribution orifice system for a dry agricultural product applicator with a pneumatic conveyance system is provided that redirects product that drags along a surface(s) of a delivery line's wall(s) back into a main central or primary airflow. A ring ramp of the distribution orifice system may present an annular ramped ID (inside diameter) constriction in a product distributor or other product delivery line.

According to one aspect of the invention, the distribution orifice system presents a ramped constriction in a delivery line that redirects particulate matter back into a main airflow portion, which may help regulate system pressure by avoiding localized pressure increases at or behind masses or volumes of settled-out or other flow-compromised volumes of particulate material. The distribution orifice system may include a ring ramp with ramped surfaces facing both upstream and downstream. The ring ramp may be longitudinally symmetrical which facilitates initial assembly since it cannot be installed backwards. After sufficient use that wears the upstream facing ramped surface, the ring ramp can be renewed by removing, flipping, and reassembling to present an un-wore ramp surface that was previously facing downstream while presenting the worn surface in a downstream direction.

According to another aspect of the invention, the ring ramp includes an annular body mounted concentrically in the product delivery line. The ring ramp may include a first end facing an upstream direction, a second end facing a downstream direction, and a multi-directional ramp. The multi-directional ramp may include opposite ramped surfaces, with a first ramped surface arranged toward the first end and facing the upstream direction and a second ramped surface arranged toward the second end and facing the downstream direction.

According to another aspect of the invention, the product delivery line may be defined by a product distributor that divides a primary airflow into multiple secondary airflows that are separately directed to different nozzles and delivery locations at the boom. The product distributor may include a tubular main distributor body. An inlet end is connected to an upstream primary delivery line through which a primary airflow carries air-entrained dry agricultural product. An outlet end is connected to multiple downstream secondary delivery lines through which respective secondary airflows carry air-entrained dry agricultural product. The tubular main distributor body may be segmented. A first body segment defines the inlet end of the tubular main distributor body and a second body segment defines the outlet end of the tubular main distributor body. A distributor tube joint defined at a point of engagement of the first and second body segments and the ring ramp may be arranged at the distributor tube joint. The distributor tube joint may provide an annular channel that defines a first channel segment as a first recess into the first body segment and a second channel segment as a second recess into the second body segment and the ring ramp may be seated in the annular channel of the distributor tube joint. A pair of flanges of the distributor body segments may engage each other at the distributor tube joint, with the channel defined and ring ramp seated radially below the engaging flanges.

According to another aspect of the invention, the ring ramp includes a base ring that may have a thickness that matches a depth of the channel, so the base ring of the ring ramp sits flush in the channel, with the multi-directional ramp extending inward from the base ring toward or further into the product distributor's interior. The base ring's width may be slightly greater than the width of the channel to axially or longitudinally compress the ring ramp when installed.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 is an isometric view of an agricultural machine shown as a self-propelled dry product applicator with a distribution orifice system according to the present invention;

Figure 1:
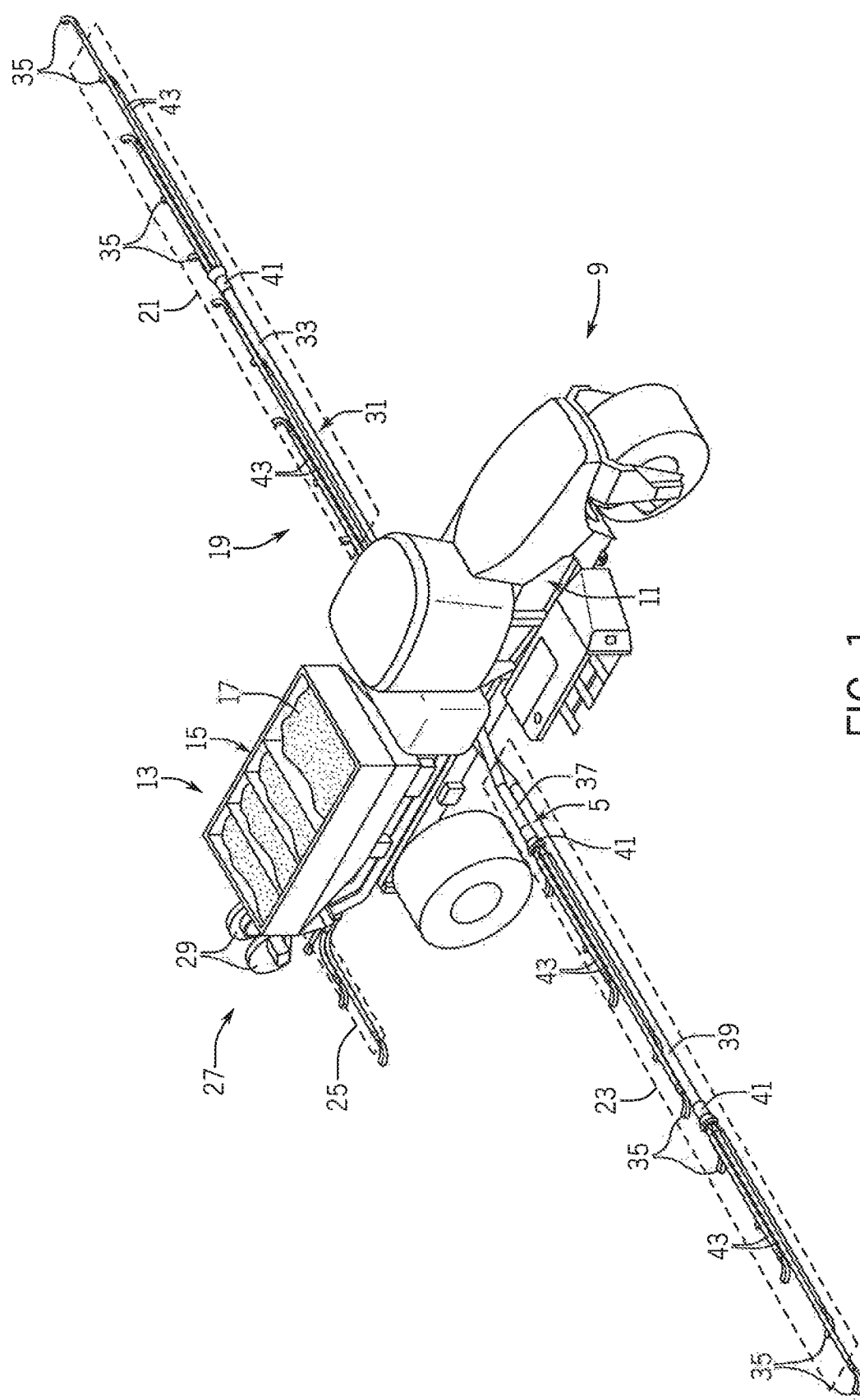
Figure 2:
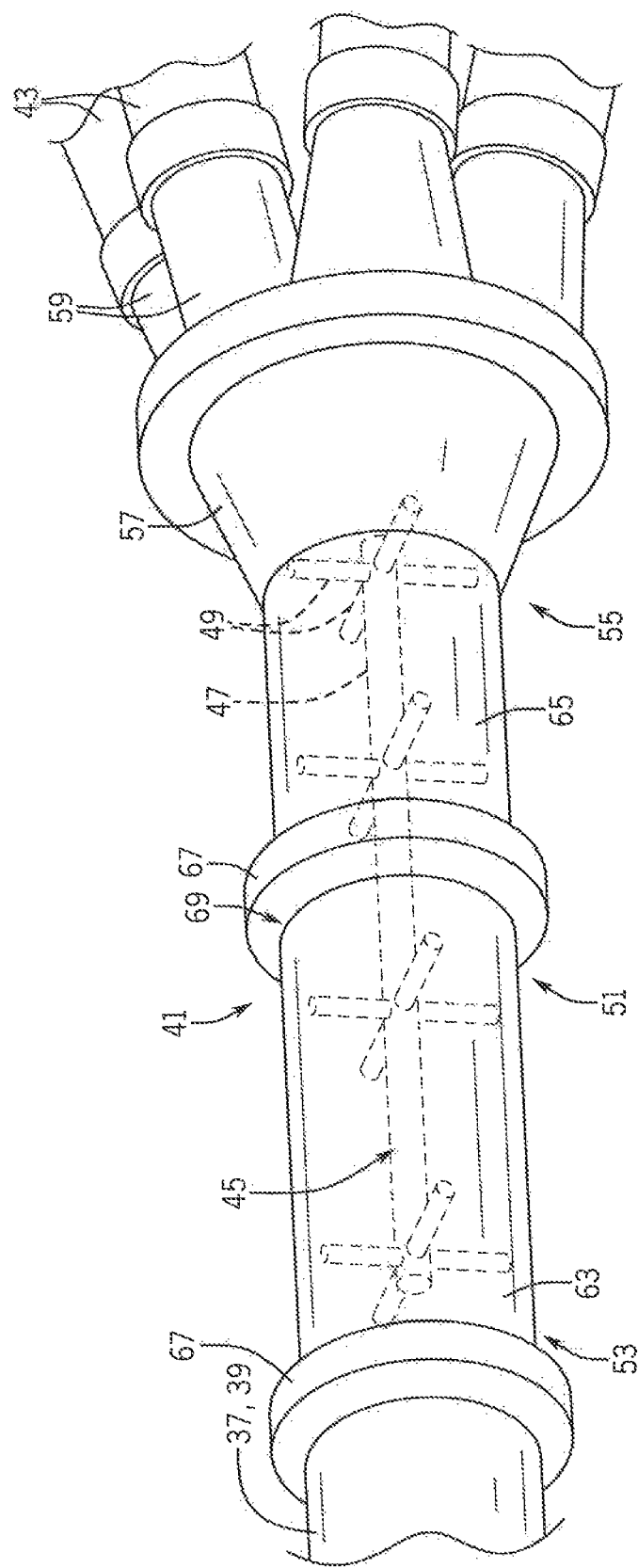
FIG. 2 is a simplified partially schematic isometric view of the distribution orifice system of FIG. 1.
Figure 3:
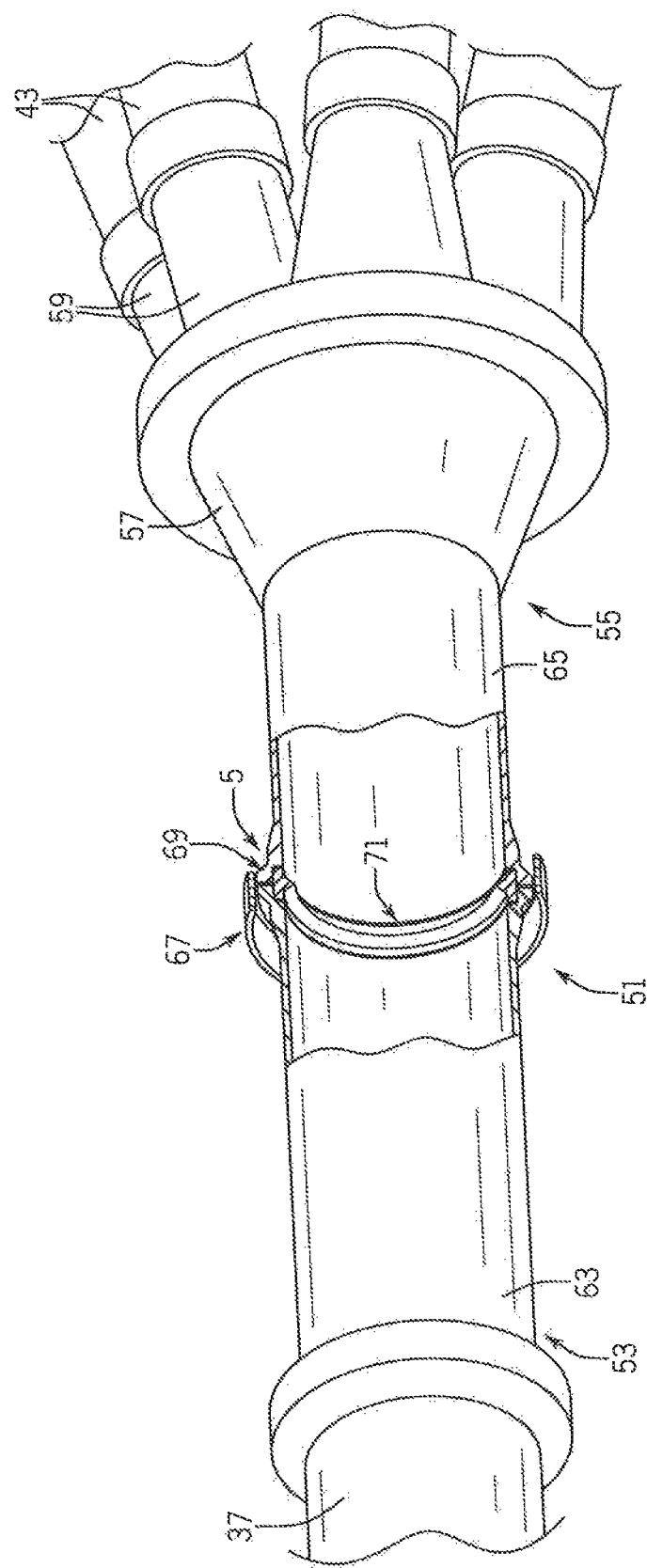
FIG. 3 is the simplified partially schematic isometric view of the distribution orifice system of FIG. 2 with a partial cutaway.

DETAILED DESCRIPTION OF THE PREFERRED EMBODIMENTS

Referring now to the drawings and specifically to FIG. 1, a distribution orifice system is shown as system 5 that improves delivery consistency by redirecting pneumatically conveyed particulate matter of a dry agricultural product away from delivery line walls and back into a main airflow portion to provide a more uniform distribution of particulate matter in the conveying airflow and which may help regulate system pressure.

Still referring to FIG. 1, system 5 is incorporated in an agricultural machine shown as a self-propelled dry product applicator 9, such as a Case IH—Titan™ series floater applicator available from CNH Industrial. The agricultural machine may be other machines including other applicators that use pneumatic conveyance to deliver, for example, particulate material as dry agricultural product through booms or other structures with delivery lines.

Still referring to FIG. 1, applicator 9 includes chassis 11 with a chassis frame that supports various assemblies, systems, and components. These various assemblies, systems, and components include a cab, an engine, a hydraulic system that receives power from the engine to provide hydraulic pressure for operating hydraulic components and systems, a bulk storage system 13 that includes a bin 15 that may have multiple compartments for storing different types of dry agricultural product(s) as volumes of respective particulate material 17, such as fertilizer, herbicide and insecticide. Boom system 19 pneumatically broadcasts or delivers the particulate material 17 to the agricultural field and includes segmented or other boom arms that can be folded for transportation or unfolded for use, such as left and right boom arms 21, 23 and a rear boom 25. Each of the left and right boom arms 21, 23 and rear boom 25 extends generally transversely with respect to the applicator's 9 longitudinal axis, when extended for application use.

Still referring to FIG. 1, pneumatic delivery or conveyance system 27 receives the particulate material from bin 15 through a metering system. Fan(s) 29 of the pneumatic conveyance system 27 may be hydraulically driven and delivers an airflow that entrains the particulate material that is released through the metering system. Pneumatic conveyance system 27 includes a delivery line system 31 that is supported by boom system 19.

Still referring to FIG. 1, delivery line system 31 includes a series of product delivery lines shown as delivery lines 33 that direct the particulate material 17 from its upstream storage in a downstream direction to nozzles 35 at ends of the delivery lines 33. Delivery lines 33 include various line segments, including primary delivery lines, product distributors, and secondary delivery lines. The primary delivery lines are shown here as short lines 37 (only one visible in this view) that extend a relatively shorter distance along their respective boom arms 21, 23 and long lines 39 that extend a relatively further distance along the respective boom arms 21, 23. Outer ends of the short and long lines 37, 39 are connected to product distributors 41.

Referring now to FIG. 2, each product distributor 41 is configured to divide a primary airflow into multiple secondary airflows respectively directed through secondary delivery lines, shown as secondary lines 43 with smaller diameters than the short and long lines 37, 39 and extend from the product distributor 41 to the nozzles 35. Distributor 41 is shown here with an agitator or mixer 45 in the product distributor 41. Mixer 45 has a mixer shaft 47 rotated by a motor (not shown) and with mixer fingers 49 that extend radially from the shaft 47 to collide with and deflect the particulate material 17 (FIG. 1) entrained in the conveying airflow. This randomizes and provides an even greater distribution of the particulate material 17 that is divided into and flows through the different secondary lines 43.

Still referring to FIG. 2, distributor 41 has a tubular main distributor body 51 with inlet end 53 that is connected to an upstream primary delivery line, such as short or long line 37, 39. Outlet end 55 includes divider 57 that has a conically expanding portion with multiple outlets 59 connected to the multiple downstream secondary lines 43. Main distributor body 51 is shown here in a segmented configuration with first and second body segments 63, 65 respectively at the inlet and outlet ends 53, 55. Connectors, represented here as v-band clamps 67, are shown as the connection hardware that secures the first body segment 63 to short or long line 37, 39 and also secures the first and second body segments 63, 65 to each other to define a distributor tube joint 69 at their engagement(s).

Referring now to FIG. 3, system 5 is shown implemented with distributor 41 as the product delivery line, downstream of short line 37. Although mixer 45 (FIG. 2) may be implemented in distributor 41, it is not shown here to simplify the view. System 5 includes ring ramp 71 that is concentrically seated in distributor body 51, shown at the distributor tube joint 69.

Referring now to FIG. 4, at the outside or outer circumferential surface of distributor body 51, first and second flanges 73, 75 extend radially outward from the respective first and second body segments 63, 65 at distributor tube joint 69. The ends of the first and second body segment 63, 65 from which the first and second flanges 73, 75 extend are shown thicker than the remainder of the circumferential sidewall(s) of first and second body segment 63, 65, as thicker wall or collar portions 77, 79. The first and second flanges 73, 75 engage each other as held by v-band clamp 67. An inner band 81 of v-band clamp fits over the first and second flanges 73, 75 and outer clamp 83 tightens concentrically to radially move inner band 81 to wedge against first and second flanges 73, 75 and tighten them into face-to-face engagement with each other.

Referring now to FIG. 5, at the inside of distributor body 51, the inner circumferential surface 85 has an inwardly extending channel 87 that is shown defined at distributor tube joint 69 with a U-shaped configuration, with portions of the channel defined by portions of the first and second body segments 63, 65. Channel 87 is shown as an annular channel, with a first channel segment as a first recess 91 into first body segment 63 and a second channel segment as a second recess 93 into second body segment 65. A base wall of channel 87 in this segmented implementation is collectively defined by first and second base wall segments 97, 99 at the ends of the first and second body segments 63, 65. Channel side walls of channel 87 are defined by first and second base side walls 101, 103 at the ends of the first and second body segments 63, 65.

Figure 5:
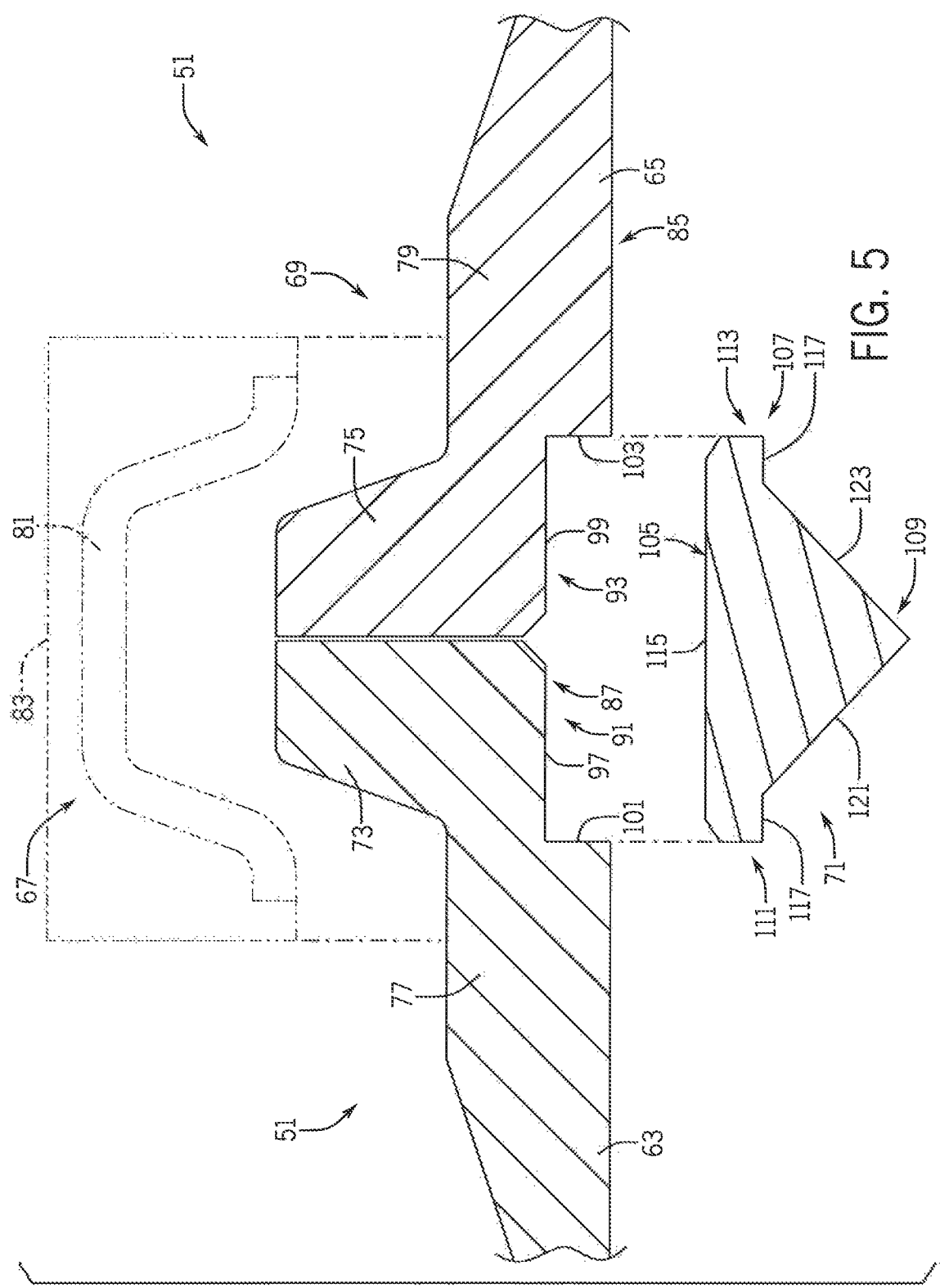
FIG. 5 is an exploded cross-sectional side elevation view of a portion of the distribution orifice system of FIG. 1.

Still referring to FIG. 5, ring ramp 71 has an annular body 105 that with base ring 107 and multi-directional ramp 109 that extends from base ring 107 to provide a particulate material deflecting ramped constriction in the product line. This redirects particulate material away from surfaces of the product line and into the main central airflow or centrally flowing main airflow portion. First and second sides or ends 111, 113 of ring ramp 71 provides respective first and second end surfaces that face upstream or downstream, depending on the orientation of ring ramp 71 in channel 87. Outer and inner circumferential surfaces 115, 117 of base ring 107 respectively face away from and toward an interior of the distributor body 51. Base ring inner circumferential surface 117 is shown here as segmented, with segments at the first and second ends 111, 113 and multi-directional ramp 109 separating the inner circumferential surface segments.

Still referring to FIG. 5, a base ring thickness is defined between its outer and inner circumferential surfaces 115, 117. The base ring thickness may be substantially the same as the channel depth, for example, plus or minus 10-percent, so when ring ramp 71 is seated in channel 87, the ring base inner circumferential surface 117 is flush or substantially aligned with the inner circumferential surface 85 of the tubular main distributor body 51. A base ring width is defined between the first and second ends 111, 113 and may be substantially the same but slightly greater than a channel width defined between the first and second base side walls 101, 103 of channel 87. In this way, when v-band clamp 67 is tightened, the first and second base side walls 101, 103 axially compress the base ring 107 when ring ramp 71 is seated in channel 87. When installed, ring ramp 71 is locked in its position within delivery line 33 (FIG. 1), such as product distributor 41 (FIG. 1), both radially and axially by its outer concentric and front-to-back shoulder-type engagements with respective surfaces of channel 87.

Still referring to FIG. 5, multi-directional ramp 109 includes first and second ramped surfaces 121, 123 at the respective first and second ends 111, 113, that face upstream or downstream, depending on the orientation of ring ramp 71 in channel 87. First and second ramped surfaces 121, 123 are shown here intersecting each other at a front-to-back reflective plane to define an angle that may provide longitudinal or front-to-back symmetry to ring ramp 71. The angle of intersection of the first and second ramped surfaces 121, 123 is typically between about 75-degrees and 105-degrees, plus or minus 15-percent, shown here with an angle of about 90-degrees. The angle of the particular first or second ramped surface 121, 123 that faces upstream is typically between about 30-degrees and 60-degrees and more typically about 45-degrees, inclined up from the ring base inner circumferential surface 117 to provide a deflecting surface that guides the particulate material away from surfaces of the product delivery line 33 FIG. 1) and back into the main central airflow or centrally flowing main airflow portion, without creating an obstruction that would produce a flow-compromising pressure increase.

Figure 6:
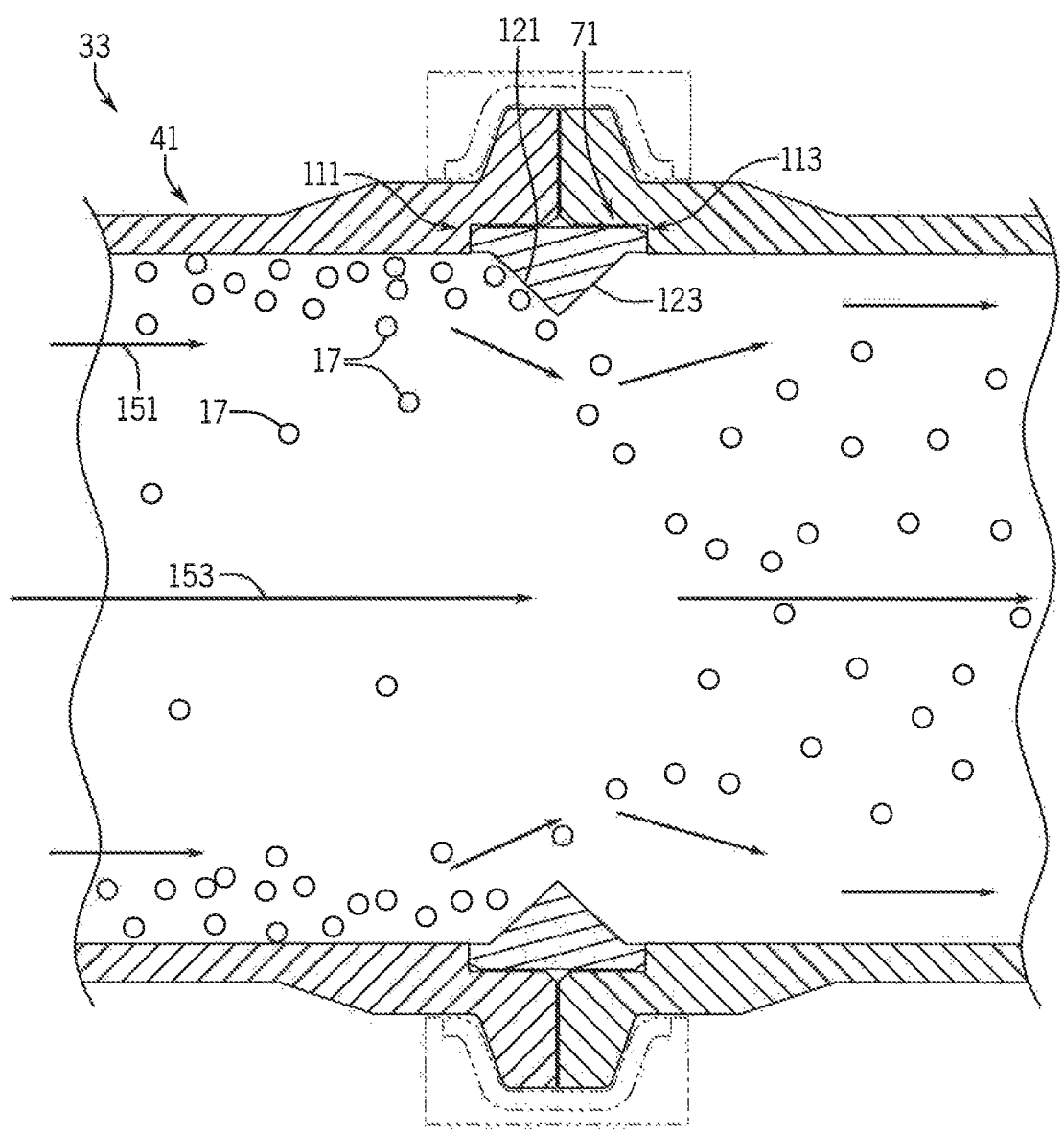
FIG. 6 is a cross-sectional side elevation view of the distribution orifice system of FIG. 1 with the ring ramp in a first position.
Figure 7:
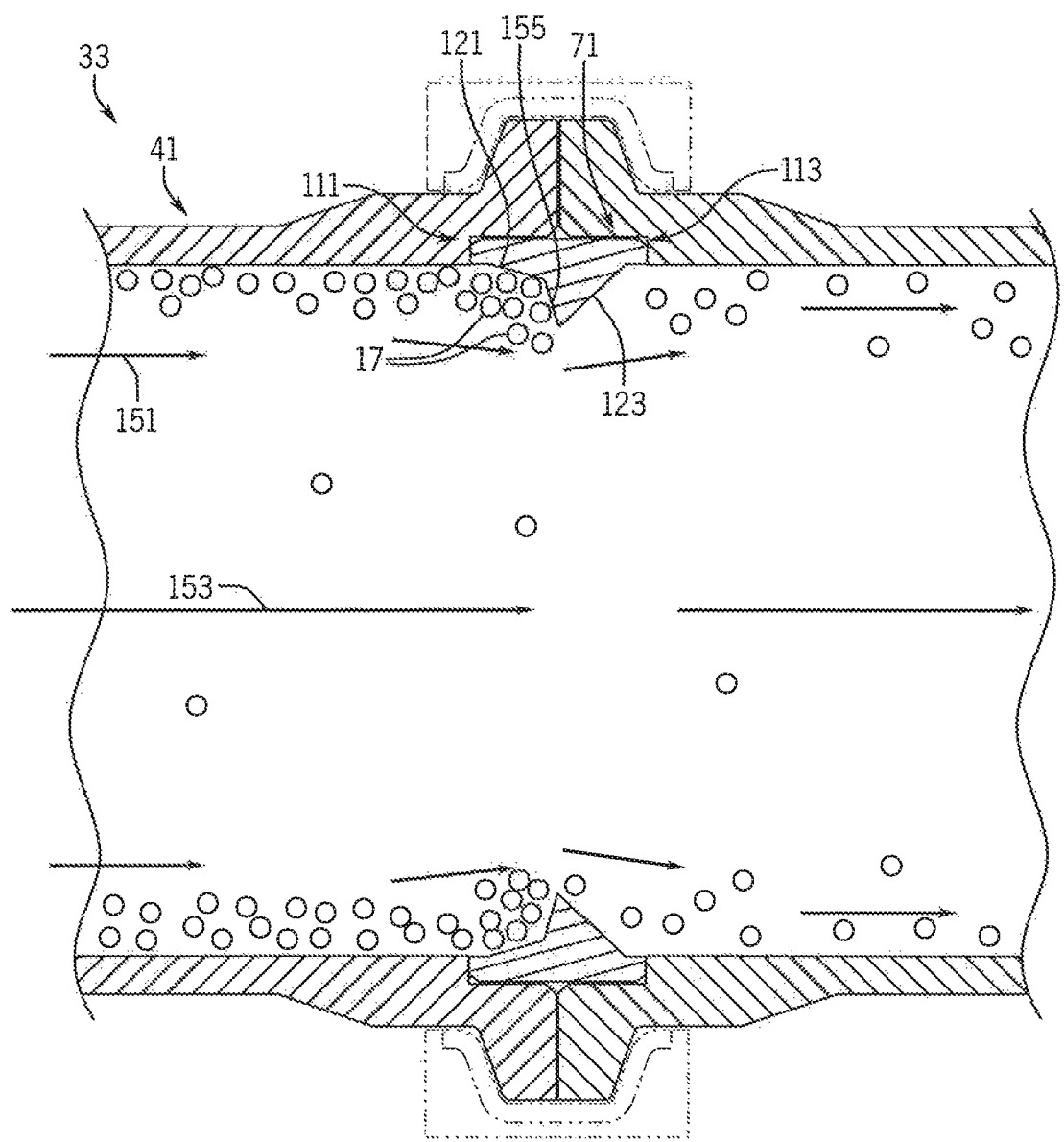
FIG. 7 is a cross-sectional side elevation view of the distribution orifice system of FIG. 1 with the ring ramp in a worn state.
Figure 8:
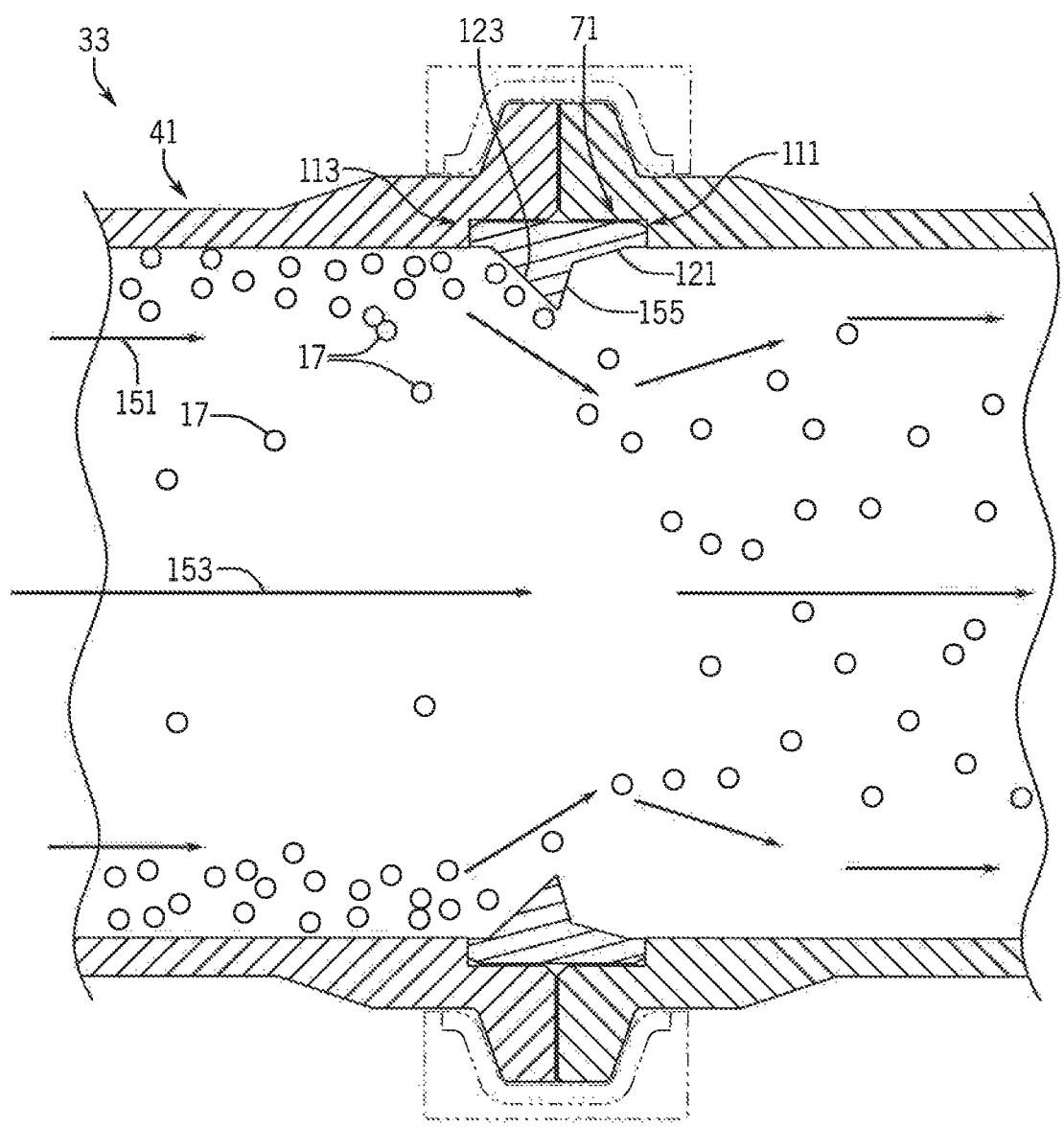
FIG. 8 is a cross-sectional side elevation view of the distribution orifice system of FIG. 1 with the ring ramp in a second, renewed, position.

Referring now to FIGS. 6-8, ring ramp 71 can be initially installed in either direction and present the same angled surface geometry to redirect particulate material 17 away from wall surfaces of the product delivery line 33 and back into the primary airflow 53 and then, after experiencing sufficient wear, can be flipped and reinstalled to renew its particulate material deflecting capability. FIG. 6 shows ring ramp 71 initially mounted in a first position or orientation with its first end 111 and first ramped surface 121 facing upstream and second end 113 and second ramped surface 123 facing downstream. Upstream of ring ramp 71 in FIG. 6, most of particulate material 17 is shown clinging to and flowing along the side wall of product distributor 41, as guided by the airflow's peripheral airflow portion 151. Fewer pieces of particulate material 17 are entrained in the primary or central airflow portion 153 upstream of ring ramp 71. At ring ramp 71, particulate material 17 deflects off from the first ramped surface 121, which guides it out of the peripheral airflow portion 151 and back toward or into the central airflow portion 153. Downstream of ring ramp 71, particulate material 17 defines a more uniform distribution in its entrainment in the central airflow portion 153.

Referring now to FIG. 7, ring ramp 71 is shown in a worn state after sufficient use to cause wear to first ramped surface 121. Wear pocket 155 was formed by abrasive action of the particulate material 17 colliding with first ramped surface 121. Instead of a gradually sloped surface, wear pocket 155 defines a flow-compromising surface configuration that may include a wall or shoulder portion, pitting, or other surface deformations that worsens the first ramped surface's ability to redirect particulate material 17 out of the peripheral airflow portion 151 and back into the main central airflow portion 153. When this happens, pressure may be increased at or upstream of ring ramp 71 and particulate material 17 may pile up against wear pocket 155 on the upstream side of ring ramp 71. Less particulate material 17 is reintroduced into the central airflow portion 153 downstream of ring ramp 71, as opposed to the first ramped surface 121 in a less wore condition (FIG. 6).

Figure 4:
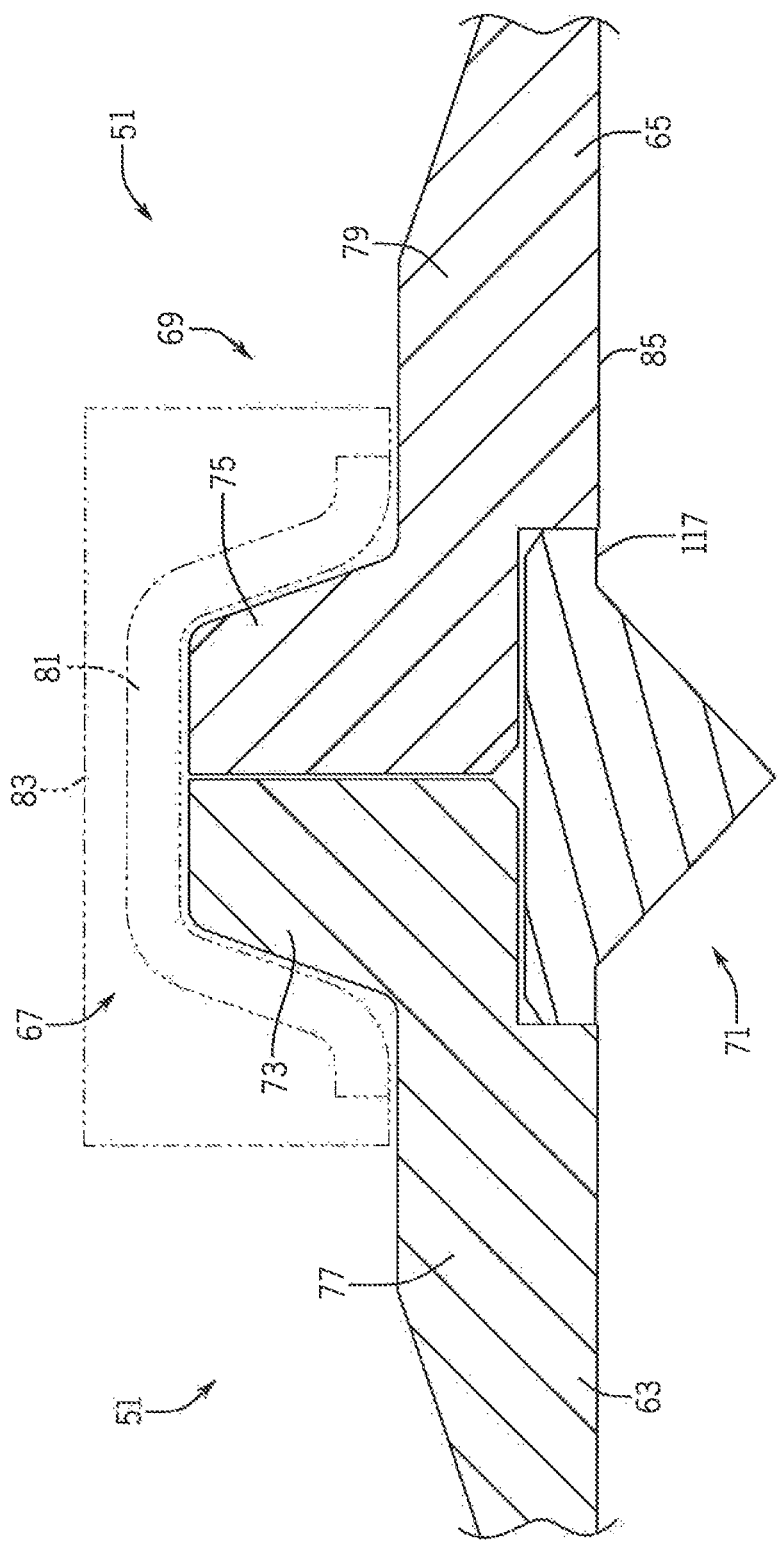
FIG. 4 is a cross-sectional side elevation view of a portion of the distribution orifice system of FIG. 1.

Referring now to FIG. 8, ring ramp 71 is shown in a second position as a renewed state after being flipped and reinstalled to present the second end 113 and second ramped surface 123 facing upstream and the first end 111 and first ramped surface 121 with its wear pocket 155 facing downstream. This may include loosening and/or removing various v-band clamps 67 and separating the first and second body segment 63, 65 of distributor 41 from each other, removing the ring ramp 71 from channel 87, rotating ring ramp 71 to face the opposite direction, reinstalling ring ramp 71 in channel 87, fitting the first and second body segment 63, 65 back against each other, and reattaching v-band clamps 67 to distributor tube joint 69. (FIG. 4). After flipping and renewing ring ramp 71, its second ramped surface 123 presents an upstream surface configuration that is substantially the same as the first ramped surface 121 at initial installation. At ring ramp 71, particulate material 17 deflects off from the second ramped surface 123, which guides it out of the peripheral airflow portion 151 and back toward or into the central airflow portion 153, with most particulate material 17 downstream of ring ramp 71 entrained in and generally uniformly distributed in the central airflow portion 153.

Many changes and modifications could be made to the invention without departing from the spirit thereof. One example is that although system 5 is shown in a horizontal use orientation, it is understood that it can be implemented in a vertical use orientation, depending on the particular end-use application. This can be done by mounting ring ramp 71 in a line or other component that is arranged generally vertical instead of horizontal. The above description(s) of components and systems of the horizontal orientation apply equally to such a vertical orientation, only rotated 90 or upright. The scope of these changes will become apparent from the appended claims.

We claim:

1. A distribution orifice system for a dry agricultural product applicator with a pneumatic conveyance system through which particulate material of a dry agricultural product is guided from an upstream bulk storage system to downstream nozzles for delivery onto an agricultural field, the distribution orifice system comprising:
    a product delivery line of the pneumatic conveyance system, the product delivery line including a circumferential sidewall that defines an inner wall surface, the product delivery line including a product distributor having an agitator therein; and
    a ring ramp with an annular body mounted concentrically in the product delivery line and positioned at least partially upstream of the agitator, the ring ramp including:
        a first end facing an upstream direction;
        a second end facing a downstream direction;
        a multi-directional ramp, including:
            a first ramped surface arranged toward the first end and facing the upstream direction;
            a second ramped surface arranged toward the second end and facing the downstream direction.

2. The distribution orifice system of claim 1, wherein the product distributor includes a tubular main distributor body that includes:
    an inlet end connected to an upstream primary delivery line through which a primary airflow carries air-entrained dry agricultural product; and
    an outlet end connected to multiple downstream secondary delivery lines through which respective secondary airflows carry air-entrained dry agricultural product.

3. The distribution orifice system of claim 2, wherein the tubular main distributor body is segmented and includes:
    a first body segment that defines the inlet end of the tubular main distributor body;
    a second body segment that defines the outlet end of the tubular main distributor body; and
    a distributor tube joint defined at a point of engagement of the first and second body segments.

4. The distribution orifice system of claim 3, wherein the ring ramp is arranged at the distributor tube joint.

5. The distribution orifice system of claim 4, wherein the distributor tube joint provides an annular channel that defines:
    a first channel segment as a first recess into the first body segment; and
    a second channel segment as a second recess into the second body segment.

6. The distribution orifice system of claim 5, wherein the ring ramp is seated in the annular channel of the distributor tube joint.

7. The distribution orifice system of claim 3, wherein the first and second body segments respectively comprise first and second flanges that engage each other at the distributor tube joint.

8. The distribution orifice system of claim 7, further comprising a clamp that squeezes first and second flanges into engagement with each other.

9. The distribution orifice system of claim 3, wherein the tubular main distributor body defines a channel that extends radially into an inner circumferential surface of the tubular main distributor body and the ring ramp is seated in the channel of the tubular main distributor body.

10. The distribution orifice system of claim 9, wherein:
    the ring ramp includes a base ring that is seated flush in the channel of the tubular main distributor body; and
    the first and second ramped surfaces extend radially inward from the ring ramp base ring.

11. The distribution orifice system of claim 10, wherein the first and second ramped surfaces extend angularly toward each other and intersect at a point of intersection aligned with a reflective plane about which the ring ramp defines a forward portion toward the first end and a back portion toward the second end that are mirror images of each other.

12. The distribution orifice system of claim 11, wherein the annular body of the ring ramp further comprises:
    a base ring that includes:
        a first end surface at the ring ramp first end;
        a second end surface at the ring ramp second end;
        an outer circumferential surface that faces away from an interior of the product distributor; and
        an inner circumferential surface that faces toward the interior of the product distributor;
    wherein the multi-directional ramp extends radially inward from the inner circumferential surface of the base ring toward the interior of the product distributor.

13. The distribution orifice system of claim 12, wherein:
    the channel is U-shaped and defined by:
        a base wall;
        a first side wall at the first body segment of the tubular main distributor body;
        a second side wall at the second body segment of the tubular main distributor body;
        the base ring has a base ring thickness defined between the base ring outer circumferential surface and the base ring inner circumferential surface; and
        wherein the base ring thickness is substantially the same as the channel depth so when the ring ramp is seated in the channel, the ring base inner circumferential surface is substantially aligned with the inner circumferential surface of the tubular main distributor body.

14. The distribution orifice system of claim 13, wherein when the ring ramp is seated in the channel, the base ring is nested in the channel with:
    the base ring first end surface engaging the first side wall of the channel; and
    the base ring second end surface engaging the second side wall of the channel.

15. The distribution orifice system of claim 14, wherein the first and second side walls of the channel axially compress the base ring when the ring ramp is seated in the channel.

16. The distribution orifice system of claim 1, wherein:
    the product delivery line includes first and second segments with corresponding first and second flanges that are connected to each other at a joint;
    the ring ramp includes a base ring arranged at the joint with the multi-directional ramp extending radially inward from the ring ramp and away from the joint.

17. The distribution orifice system of claim 16, wherein the first and second ramped surfaces intersect each other to define an angle of between about 75-degrees and 105-degrees.

18. A distribution orifice system for a dry agricultural product applicator with a pneumatic conveyance system through which particulate material of a dry agricultural product is guided from an upstream bulk storage system to downstream nozzles for delivery onto an agricultural field, the distribution orifice system comprising:
- a product delivery line of the pneumatic conveyance system with the product delivery line including a circumferential sidewall that defines an inner wall surface that surrounds a delivery line interior;
- an agitator positioned within the delivery line interior; and
- a ring ramp with first and second ramped surfaces with the ring ramp reversibly mounted in the product delivery line at least partially upstream of the agitator to define:
  - a first mounted orientation with:
    - the first ramped surface facing an upstream direction; and
    - the second ramped surface facing a downstream direction; and
  - a second mounted orientation with:
    - the first ramped surface facing the downstream direction; and
    - the second ramped surface facing the upstream direction.

19. A distribution orifice system for a dry agricultural product applicator with a pneumatic conveyance system through which particulate material of a dry agricultural product is guided from an upstream bulk storage system to downstream nozzles for delivery onto an agricultural field, the distribution orifice system comprising:
- a product delivery line of the pneumatic conveyance system with the product delivery line including a circumferential sidewall that defines an inner wall surface that surrounds a delivery line interior;
- a ring ramp with first and second ramped surfaces with the ring ramp reversibly mounted in the product delivery line to define:
  - a first mounted orientation with:
    - the first ramped surface facing an upstream direction; and
    - the second ramped surface facing a downstream direction; and
  - a second mounted orientation with:
    - the first ramped surface facing the downstream direction; and
    - the second ramped surface facing the upstream direction, wherein the product delivery line is segmented and includes:
- a first line segment with a first flange; and
- a second line segment with a second flange attached to the first flange at a joint,
wherein the ring ramp is arranged at the joint and radially inward of the first and second flanges, and wherein a void is formed between the first line segment, the second line segment, and the ring ramp.

20. The distribution orifice system of claim 19, wherein the product delivery line includes a channel that extends radially into the first line segment and the second line segment at the joint and the ring ramp is seated in the channel.

* * * * *